(12) United States Patent
Kashima et al.

(10) Patent No.: US 7,124,496 B2
(45) Date of Patent: Oct. 24, 2006

(54) METHOD OF MANUFACTURING HEAD SUSPENSION FOR DISK DRIVE

(75) Inventors: Hideki Kashima, Yokohama (JP); Ryouzou Ohmoto, Kanazawa-Ku (JP); Kazuhiko Ohtake, Kanazawa-Ku (JP)

(73) Assignee: NHK Spring Co., Ltd., Yokohama (JP)

( * ) Notice: Subject to any disclaimer, the term of this patent is extended or adjusted under 35 U.S.C. 154(b) by 452 days.

(21) Appl. No.: 10/683,007

(22) Filed: Oct. 9, 2003

(65) Prior Publication Data
US 2004/0068860 A1    Apr. 15, 2004

Related U.S. Application Data

(62) Division of application No. 09/811,083, filed on Mar. 16, 2001, now Pat. No. 6,697,227.

(30) Foreign Application Priority Data
Oct. 30, 2000  (JP)  ............................. 2000-331447

(51) Int. Cl.
G11B 5/127    (2006.01)
H04R 31/00    (2006.01)

(52) U.S. Cl. ............................... 29/603.06; 29/603.03; 29/603.04; 219/121.63; 228/181; 228/190; 360/346.2; 360/240; 360/244.2; 360/244.5; 360/266.1

(58) Field of Classification Search ............. 29/603.03, 29/603.04, 603.06, 603.07; 219/121.63; 228/181, 190; 360/345.2, 240, 244.2, 244.5–244.8, 360/266.1
See application file for complete search history.

(56) References Cited

U.S. PATENT DOCUMENTS

| | | | | |
|---|---|---|---|---|
| 5,689,389 A | * | 11/1997 | Braunheim | 360/244.6 |
| 6,230,959 B1 | * | 5/2001 | Heist et al. | 228/155 |
| 6,597,538 B1 | * | 7/2003 | Kashima et al. | 360/244.5 |

FOREIGN PATENT DOCUMENTS

JP   11245064 A   *   9/1999

OTHER PUBLICATIONS

"A PZT micro-actuated for high TPI hard disk servo systems"; Yimin Niu; Wei Guo; Guoxiao Guo; Eng Hong Ong; Sivadasan, K.K; Huang, T.; Magnetics, IEEE Transactions on vol. 36, Issue 5, Part 1; Sep. 2000; pp. 2241-2243.*

* cited by examiner

*Primary Examiner*—Paul D. Kim
(74) *Attorney, Agent, or Firm*—Kilpatrick Stockton LLP

(57) ABSTRACT

A head suspension for a disk drive has a base plate (19) to be attached to a carriage of the disk drive and a load beam (21) consisting of a rigid part (27) and a resilient part (29), to apply load onto a slider. The rigid part and resilient part are separately formed. The rigid part is joined to a first side (29a) of the resilient part. The suspension also has a reinforcing plate (37) to hold and fix a second side (29b) of the resilient part between the reinforcing plate and the base plate. The base plate stably and resiliently supports the load beam. This suspension satisfies required characteristics.

2 Claims, 4 Drawing Sheets

METHOD OF MANUFACTURING HEAD SUSPENSION FOR DISK DRIVE

RELATED APPLICATIONS

This application is a divisional of U.S. application Ser. No. 09/811,083, entitled "Head Suspension For Disk Drive and Method of Manufacturing Head Suspension," filed Mar. 16, 2001, issued as U.S. Pat. No. 6,697,227, which is incorporated herein by reference.

BACKGROUND OF THE INVENTION

1. Field of the Invention

The present invention relates to a head suspension for a disk drive incorporated in an information processing unit such as a personal computer and a method of manufacturing the suspension.

2. Description of the Related Art

A hard disk drive (HDD) used for an information processing unit has magnetic or magneto-optical disks to write and read data and a carriage. The carriage is turned around a spindle by a positioning motor.

The carriage is disclosed in, for example, U.S. Pat. No. 4,167,765. This carriage has arms, a head suspension (hereinafter referred to also as "suspension") attached to each arm, and a head attached to the suspension. The head has a slider. When each disk of the HDD is rotated at high speed, the slider slightly floats above the disk and air bearings are formed between the disk and the slider.

The suspension consists of a load beam, a flexure, and a base plate. The load beam is made of a thin precision resilient plate. The flexure is made of a very thin plate spring fixed to a front end of the load beam by, for example, laser welding. The base plate is fixed to a base of the load beam by, for example, laser welding and is fixed to each arm of the carriage.

Disks of recent HDDs are designed to densely record data and revolve at high speed. It is required, therefore, to provide a head suspension of improved vibration characteristics to carry out precision positioning of a head on a disk surface, as well as resistance to turbulence caused by the disks revolving at high speed. In addition, the suspension must be ready for intricate processes to provide new functions.

To deal with a high-density disk, the suspension must have high rigidity and a low spring constant. FIG. 1 shows a head suspension 101 for a disk drive according to a prior art. The suspension 101 has a load beam 103 that is solidly composed of a rigid part 103a of L1 in length and a resilient part 103b of L2 in length. It is hardly possible for this suspension 101 to simultaneously realize high rigidity for the rigid part 103a and a low spring constant for the resilient part 103b because the rigid part 103a and resilient part 103b are integrated with each other.

The material and thickness of the rigid part 103a are restricted by the resilient part 103b, and therefore, the rigid part 103a must improve the rigidity thereof by bends 105 or embossed ribs 107 that need additional precision processes to increase costs.

The bends 105 and ribs 107 disturb air flows and are easily influenced by turbulence due to disks rotating at high speed, to flutter the load beam 103.

The load beam 103 is fixed to a base plate 109, which is attached to a carriage arm of an HDD. To stably support the load beam 103 with the base plate 109, the base of the load beam 103 must not be thinner than a specified thickness. This restriction prevents the lowering of the spring constant of the resilient part 103b.

A flexure 111 is fixed to the load beam 103. The flexure 111 has a head 113 including a slider 115.

A technique of lowering the spring constant of a load beam is disclosed in Japanese Unexamined Patent Publication No. 9-191004. This technique partly thins a resilient part of a load beam by partial etching. The partial etching, however, has a limit in precisely controlling the thickness of the resilient part, and therefore, causes variations in the thickness and spring constant of the resilient part.

Japanese Unexamined Patent Publication No. 8-128919 discloses a technique of forming narrow plate springs around a slider supporting part of a load beam by etching or press. This technique deforms the narrow plate springs in a thickness direction, which needs fine processes because the narrow plate springs must be formed in a small area, to deform the shape of the load beam, vary the spring constant thereof, and deteriorate quality.

SUMMARY OF THE INVENTION

An object of the present invention is to provide a head suspension of high performance to meet various requirements and method of manufacturing such a head suspension.

In order to accomplish the object, a first aspect of the present invention provides a head suspension for a disk drive, having a base plate to be attached to a carriage of the disk drive, and a load beam consisting of a rigid part and a resilient part, to apply load onto a slider. The rigid part and resilient part are separately formed, and the rigid part is joined to a first side of the resilient part. The suspension also has a reinforcing plate to bold and fix a second side of the resilient part between the reinforcing plate and the base plate.

The first aspect resiliently supports the load beam with the base plate through the resilient part. The material and thickness of the rigid part are not restricted by the resilient part because the first aspect separately forms the rigid part and resilient part with proper materials and thicknesses that meet their respective requirements to provide required performance for the suspension. For example, the rigid part is made of a thick plate to increase rigidity without bends or ribs and reduce air resistance. This results in reducing turbulence caused by the high-speed rotation of disks and preventing the fluttering of the suspension.

The first aspect stably holds the resilient part between the base plate and the reinforcing plate, so that the base plate may stably and resiliently support the rigid part through the resilient part. This three-layer structure of the base plate, resilient part, and reinforcing plate enables the resilient part to be thinned to secure a low spring constant. The low spring constant is also securable because the resilient part is formed independently of the rigid part. The first aspect simultaneously realizes stability, accuracy, and low spring constant for the resilient part.

The first aspect may form the rigid part from softer material than the resilient part. This expands the degree of freedom of the designing and processing of the rigid part.

A second aspect of the present invention provides the base plate with a boss protruding from the base plate in a thickness direction. The boss is fitted to a hole formed in the carriage, to fix the base plate to the carriage. The second aspect also provides each of the resilient part and reinforcing plate with a hole to receive the boss with at least one of the holes serving as a positioning hole that precisely fits the boss.

The second aspect correctly positions the load beam with respect to the base plate and sandwiches the resilient part between the base plate and the reinforcing plate. This results in stabilizing the manufacturing of the suspension.

A third aspect of the present invention makes each of the base plate and reinforcing plate thicker than the resilient part.

The third aspect firmly holds the resilient part between the base plate and the reinforcing plate and realizes a low spring constant.

A fourth aspect of the present invention provides a method of manufacturing a head suspension for a disk drive. The suspension has a base plate to be attached to a carriage of the disk drive, a load beam consisting of a rigid part and a resilient part, to apply load onto a slider, the rigid part and resilient part being separately formed, the rigid part being joined to a first side of the resilient part, and a reinforcing plate to hold and fix a second side of the resilient part between the reinforcing plate and the base plate. The method includes a first step of forming small holes in at least one of the base plate and reinforcing plate, and a second step of welding the base plate, resilient part, and reinforcing plate by emitting laser beams into the small holes, to fix the second side of the resilient part between the base plate and the reinforcing plate.

The fourth aspect welds the three-layer structure of the base plate, resilient part, and reinforcing plate together by emitting laser beams into the small holes. The use of the small holes saves laser power and surely welds the three layers together. Due to the low laser power, the fourth aspect reduces the influence of heat on the suspension and maintains precise flatness on the three-layer structure.

A fifth aspect of the present invention provides the base plate with a boss protruding from the base plate in a thickness direction. The boss is fitted to a hole formed in the carriage, to fix the base plate to the carriage. The fifth aspect also provides each of the resilient part and reinforcing plate with a hole to receive the boss, at least one of the holes serving as a positioning hole that precisely fits the boss. The fifth aspect forms, in the first step of the fourth aspect, small holes in at least one of the base plate and reinforcing plate on each side of the boss receiving hole. The fifth aspect welds, in the second step of the fourth aspect, the base plate, resilient part, and reinforcing plate by emitting laser beams into the small holes, to fix the second side of the resilient part between the base plate and the reinforcing plate.

The fifth aspect uses one of the holes formed through the reinforcing plate and resilient part as a precision positioning hole for the boss and precisely positions the load beam with respect to the base plate. At the same time, the fifth aspect holds the resilient part between the base plate and the reinforcing plate and welds them together on each side of the boss. The fifth aspect correctly and stably fabricates the suspension.

DESCRIPTION OF THE PREFERRED EMBODIMENTS

Figure 2:
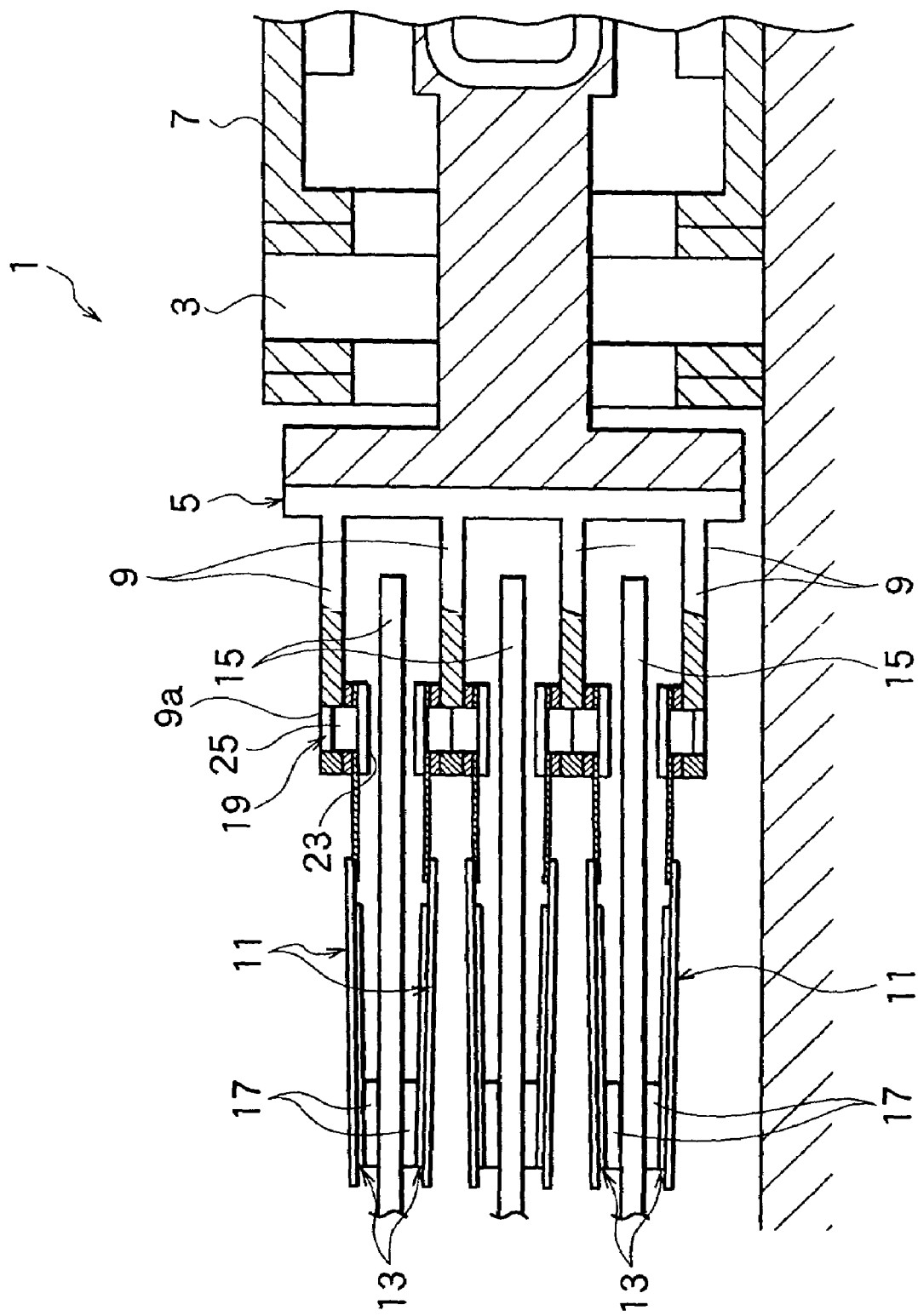
FIG. 2 is a sectional view partly showing an HDD employing suspensions according to an embodiment of the present invention.

FIG. 2 is a sectional view partly showing an HDD employing suspensions according to an embodiment of the present invention. The HDD 1 has a carriage 5 that is turned around a spindle 3 by a positioning motor 7 such as a voice coil motor.

The carriage 5 has a plurality of (four in FIG. 2) arms 9 each having the suspension 11 of the present invention. The suspension 11 has a head 13. The carriage 5 is driven around the spindle 3 by the motor 7, to move the head 13 onto a required track on a disk 15. The head 13 has a slider 17 to face a track on the disk 15. The slider 17 has a transducer (not shown).

When the disk 15 is revolved at high speed, air enters between the slider 17 and the disk 15 to slightly float the slider 17 above the disk 15 and form air bearings between them.

Figure 3:
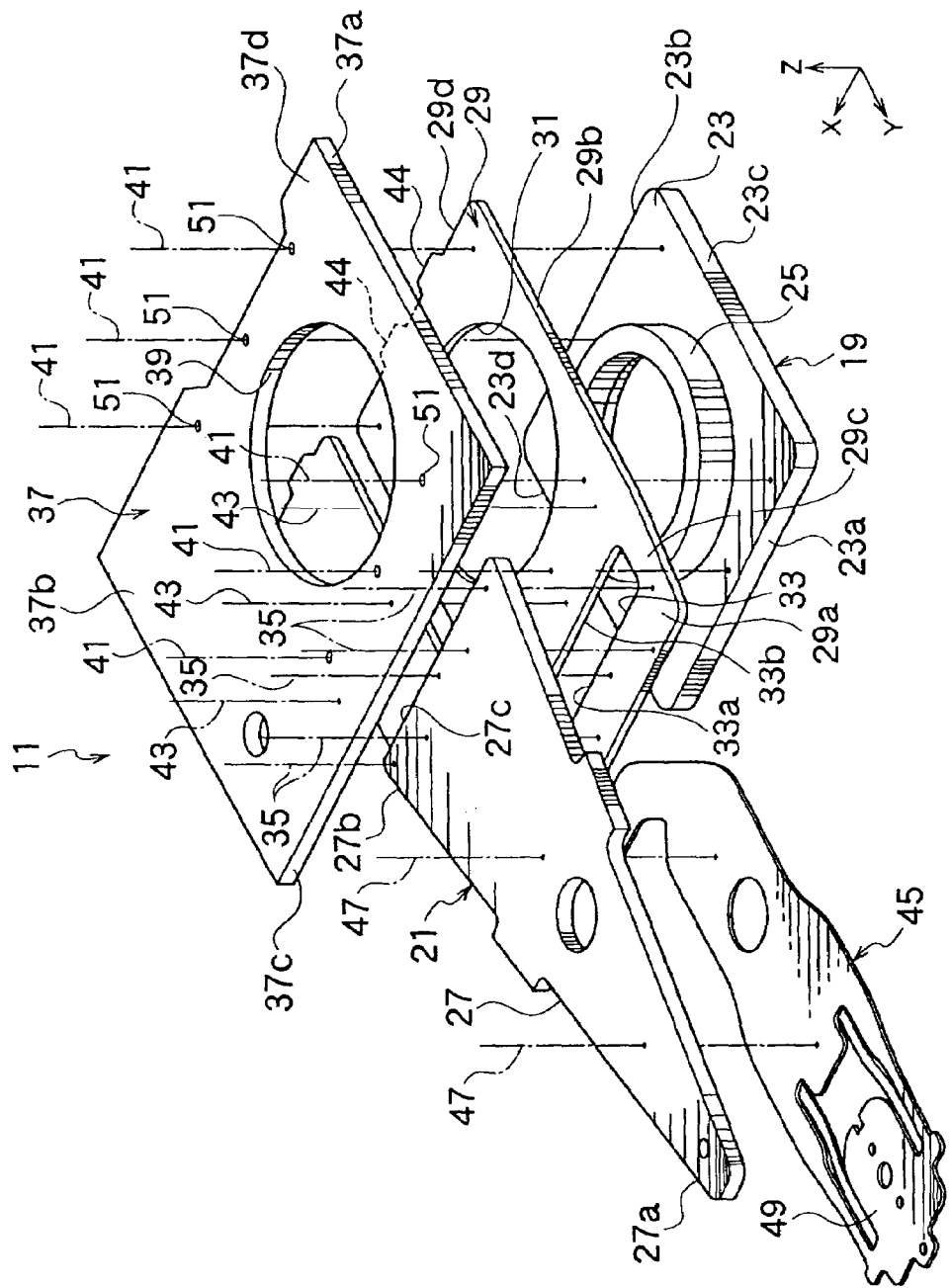
FIG. 3 is an exploded perspective view showing the suspension of the embodiment.

FIG. 3 is an exploded perspective view showing the suspension 11 of the present invention. The suspension 11 has a base plate 19 and a load beam 21. The base plate 19 is attached to the arm 9 (FIG. 2). The base plate 19 consists of a flange 23 and a boss 25.

The flange 23 is substantially square in plan view and has a thickness t1 of, for example, 150 µm. The boss 25 is fitted to a hole 9a formed through the arm 9, to fix the base plate 19 to the arm.

The load beam 21 applies load onto the slider 17 and consists of a rigid part 27 and a resilient part 29, which are separately formed.

The rigid part 27 is substantially triangular with the width thereof gradually widening from a front end 27a toward a base end 27b. The rigid part 27 is thicker than the resilient part 29, and according to the embodiment, is equal to a reinforcing plate 37 in thickness. The rigid part 27 is made of, for example, stainless steel. The rigid part 27 may be made of an alloy of light metal (lighter than Fe) such as aluminum (Al) and titanium (Ti), or synthetic resin to reduce weight and increase rigidity. Alternatively, the rigid part 27 may be a composite or clad material composed of layers of two or more materials including light metal such as aluminum and titanium, alloys of light metal, and other metals such as stainless steel.

The resilient part 29 is a thin rectangular plate that is placed on the base plate 19 and extends to the rigid part 27. The resilient part 29 is, for example, a thin resilient stainless steel rolled plate having a precise low spring constant that is lower than the spring constant of the rigid part 27. The resilient part 29 has a thickness t2 of, for example, 40 µm.

An X-direction length of the resilient part 29 is substantially equal to that of the flange 23 and a Y-direction length thereof is longer than that of the flange 23. The resilient part 29 has a first side 29a and a second side 29b in the Y-direction. The second side 29b has a hole 31 fitted to the boss 25. The diameter of the hole 31 may be equal to or slightly larger than the outer diameter of the boss 25.

The first side 29a of the resilient part 29 protrudes from the flange 23 in the Y-direction and has a rectangular opening 33 formed by etching, precision press, etc. The opening 33 forms a hinge 29c between the first and second sides 29a and 29b, to partly decrease the bending rigidity or resilience of the resilient part 29.

The base end 27b of the rigid part 27 is on the first side 29a of the resilient part 29 and is welded thereto with laser beams depicted with dot-and-dash lines 35. In the example of FIG. 3, the laser beams 35 are aimed at two points in a front row and three points in a near row on the base end 27b, to weld the base end 27b to the first side 29a. After the welding, a rear edge 27c of the rigid part 27 is substantially on a front edge 33a of the opening 33.

Instead of the laser welding, other means such as adhesives can be used to fix the rigid part 27 to the resilient part 29. If the rigid part 27 is made of synthetic resin, an in-mold technique will be employed. Namely, the resilient part 29 is set in a mold that is used to form the rigid part 27, and resin is poured into the mold. When the resin solidifies, the rigid part 27 and resilient part 29 are integral with each other.

The hole 31 of the resilient part 29 is fitted to the boss 25 of the base plate 19, so that the second side 29b may overlap the flange 23. At this time, a rear edge 33b of the opening 33 slightly protrudes from a front edge 23a of the flange 23.

An edge 29d of the resilient part 29 protrudes from an edge 23b of the flange 23. Even if the resilient part 29 has burrs 44, they will be outside the overlapping resilient part 29 and flange 23, so that the flange 23, the second side 29b of the resilient part 29, and reinforcing plate 37 may tightly and correctly be laid one upon another.

The reinforcing plate 37 holds the second side 29b of the resilient part 29 between itself and the flange 23. In the Y-direction, the reinforcing plate 37 is slightly longer than the flange 23.

The reinforcing plate 37 has a positioning hole 39 to receive the boss 25. The hole 39 is formed by, for example, etching to precisely match with the outer diameter of the boss 25 for X-Y positioning. According to the embodiment, the reinforcing plate 37 is formed integrally with the rigid part 27, and thereafter, is separated therefrom. The reinforcing plate 37 is made of, for example, stainless steel and has a thickness t3 of, for example, 100 μm.

The reinforcing plate 37 is placed on the second side 29b of the resilient part 29 with the hole 39 precisely fitting to the boss 25, so that the second side 29b is sandwiched between the base plate 19 and the reinforcing plate 37. This three-layer structure is welded together with laser beams depicted with dot-and-dash lines 41. In the example of FIG. 3, the laser beams 41 are aimed at three points in a row on each side of the boss 25, i.e., six points in total.

The reinforcing plate 37 is welded to the resilient part 29 outside the edge 23a of the flange 23 with laser beams depicted with dot-and-dash lines 43. In the example of FIG. 3, the laser beams 43 are aimed at three points in a row along an edge 37c of the reinforcing plate 37.

After the welding, an edge 37a of the reinforcing plate 37 is substantially on an edge 23c of the flange 23. An edge 37b of the reinforcing plate 37 protrudes from an edge 23d of the flange 23. The edge 37c of the reinforcing plate 37 is substantially on the rear edge 33b of the opening 33. An edge 37d of the reinforcing plate 37 is substantially on the edge 29d of the resilient part 29.

A flexure 45 is attached to the rigid part 21. The flexure 45 is made of, for example, a thin resilient stainless steel rolled plate on which an insulating layer is formed. A conductor (not shown) is formed on the insulating layer. An end of the conductor is connected to a terminal of the head 13 (FIG. 2) and the other end thereof is connected to an external terminal (not shown). The flexure 45 has a tongue 49 to which the slider 17 (FIG. 2) of the head 13 is attached. The flexure 45 is welded to the rigid part 21 with laser beams depicted with dot-and-dash lines 47. Other means such as adhesives are also employable to fix the flexure 45 to the rigid part 21.

The suspension 11 of the structure mentioned above is fixed to the arm 9 (FIG. 2). More precisely, the boss 25 is inserted into the hole 9a of the arm 9 and is processed by plastic working such as widening with the use of a jig, to fix the suspension 11 to the arm 9.

The flange 23 of the base plate 19 is opposite to the arm 9 with the resilient part 29 interposing between them, to secure a gap between the load beam 21 and the disk 15 irrespective of the three-layer structure of the base plate 19, resilient part 29, and reinforcing plate 37. The suspension 11 is compact, and at the same time, is capable of securing a sufficient inclination angle for the load beam 21 with respect to the disk 15.

Since the rigid part 27 and resilient part 29 that form the load beam 21 are discrete, they can be made of different materials with different thicknesses. As a result, requirements such as high rigidity for the rigid part 27 and a low spring constant for the resilient part 29 can simultaneously be met. The resilient part 29 may be made of a precision rolled plate to provide a stable low spring constant.

The second side 29b of the resilient part 29 is sandwiched between the base plate 19 and the reinforcing plate 37, so that the base plate 19 may stably support the resilient part 29 in the three-layer structure and so that the base plate 19 may stably and resiliently support the rigid part 27 through the resilient part 29. The flange 23 and reinforcing plate 37 are each thicker than the resilient part 29, and therefore, the base plate 19 stably supports the resilient part 29 and resiliently supports the rigid part 27. This structure enables the resilient part 29 to be thin to secure a low spring constant while securing stability and accuracy.

Figure 1:
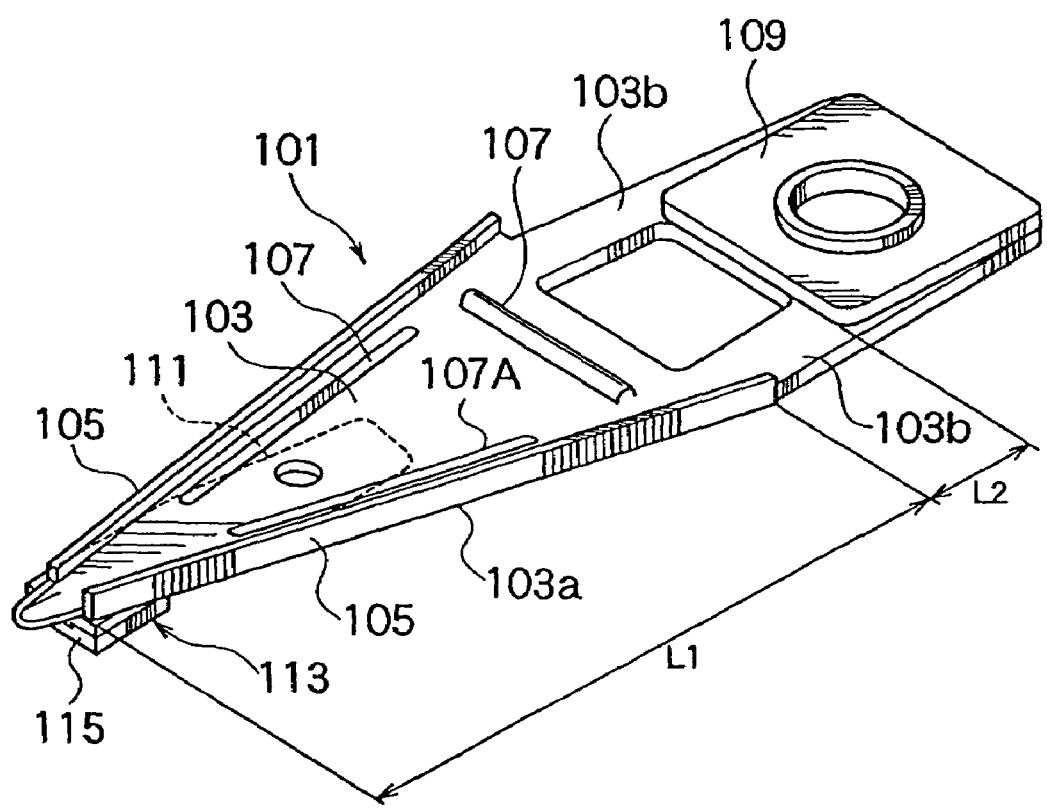
FIG. 1 is a perspective view showing a head suspension for a disk drive according to a prior art.

According to the embodiment, the rigid part 27 is properly thick to smooth air flows and avoid the influence of turbulence caused when the disks 15 are rotated at high speed, without the bends or ribs of the prior art of FIG. 1.

As will be explained in detail in connection with a manufacturing method, the rigid part 27, reinforcing plate 37, and resilient part 29 are aligned with respect to one another, and the base plate 19 is placed by inserting the boss 25 into the positioning hole 39. As a result, the rigid part 27, resilient part 29, and reinforcing plate 37 are correctly positioned with respect to the base plate 19 in the X- and Y-directions. The boss 25 is circular to optionally be oriented around a Z-axis, and therefore, the base plate 19 is easy to position with respect to the rigid part 27, resilient part 29, and reinforcing plate 37.

Figure 4:
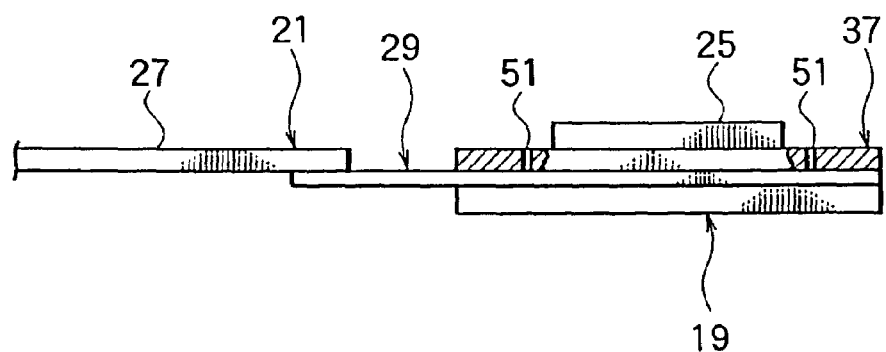
FIG. 4 is a partly broken side view showing the suspension of the embodiment having small holes for laser beams.
Figures 5A, 5B:
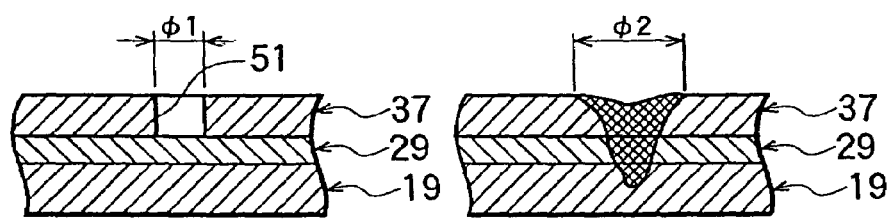
FIG. 5A is an enlarged section showing the small hole for a laser beam and the periphery thereof.
FIG. 5B is an enlarged section showing the small hole after laser welding.

A method of simultaneously welding the base plate 19, resilient part 29, and reinforcing plate 37 will be explained with reference to FIG. 3 to 5B in which FIG. 4 is a partly broken side view showing the suspension 11 before welding, FIG. 5A is an enlarged section showing a welding small hole 51 and the periphery thereof, and FIG. 5B is an enlarged section showing a welded area.

A first step of the method forms small holes 51 in the reinforcing plate 37. The small holes 51 are used for laser welding and are formed on each side of the positioning hole 39, i.e., on each side of the boss 25. In the example of FIG. 3, three small holes 51 corresponding to the laser beams 41 are formed in a row on each side of the hole 39, i.e., six small holes 51 in total. Each small hole 51 has a diameter φ1, of, for example, 0.12 mm, which is smaller than the diameter φ2 of the welded area W. This is because the small hole 51 is sized to melt the periphery thereof when a laser beam is emitted into the small hole 51. The size of the small hole 51 is not particularly limited and is designed to melt the periphery thereby when the small hole 51 is irradiated with a laser beam.

A second step of the method emits a laser beam along each line 41 into each small hole 51, to weld the flange 23, resilient part 29, and reinforcing plate 37 together as shown in FIG. 5B. This fixes the second side 29b of the resilient part 29 between the base plate 19 and the reinforcing plate 37. The diameter φ2 of the welded area W is, for example, 0.3 to 0.4 mm.

Compared with welding the three-layer structure of the base plate 19, resilient part 29, and reinforcing plate 37 without small holes 51, the welding of the three-layer structure with the small holes 51 reduces laser power to obtain the same welding quality of strength. The reduced laser power greatly reduces a thermal influence of the three-layer structure and secures the flatness thereof.

The embodiment sandwiches and fixes the thin resilient part 29 between the thick base plate 19 and reinforcing plate 37, to form the three-layer structure that secures flatness and accuracy.

The hole 31 of the resilient part 29 may be formed as a positioning hole that accurately fits the boss 25, and the hole 39 of the reinforcing plate 37 as a hole that loosely fits the boss 25. The small holes 51 may be formed in the flange 23 so that laser beams may be emitted from the flange 23 side. The small holes 51 may be formed in both the reinforcing plate 37 and flange 23 at different positions, so that laser beams may be emitted from the reinforcing plate 37 side as well as from the flange 23 side.

The parts that form the suspension II are arranged and positioned according to a manufacturing method disclosed in Japanese Patent Publication No. 2000-57723 of this applicant. Namely, the rigid part 27 and reinforcing plate 37 are connected to each other through horizontal bridges, and the edge 37d of the reinforcing plate 37 is connected to a scrap area through legs. The scrap area extends along the edge 37d. The connected rigid part 27 and reinforcing plate 37 form a semi-finished material, and many such semi-finished materials are chained at given intervals and are connected to the scrap area. The scrap area has positioning holes at given intervals.

Similarly, the edge 29d of the resilient part 29 is connected with legs to a scrap area, which extends like the scrap area mentioned above. Many such resilient parts 29 are chained at give intervals and are connected to the scrap area having positioning holes.

The positioning holes of the scrap area of the rigid parts 27 and reinforcing plates 37 are set on pins of a jig. Thereafter, the positioning holes of the scrap area of the resilient parts 29 are set on the jig pins so that the resilient parts 29 overlap the rigid parts 27 and reinforcing plates 37. Namely, the chained rigid parts 27 and reinforcing plates 37 are positioned with respect to the chained resilient parts 29.

Each base plate 19 is placed on each resilient part 29 with the boss 25 being passed through the hole 31 and precisely fitted into the hole 39.

Each three-layer structure composed of the base plate 19, resilient part 29, and reinforcing plate 37 is fixed together by laser welding. At this time, the reinforcing plate 37 is welded to the resilient part 29, and the resilient part 29 is welded to the rigid part 27 by laser welding.

The bridges connection the rigid part 27 to the reinforcing plates 37, the legs connecting the reinforcing plates 37 to the scrap area, and the legs connecting the resilient part 29 to the scrap area are collectively cut off.

As a result, the burrs 44 of the resilient part 29 protrude outside, so that the burrs 44 never affect the three-layer structure of the base plate 19, resilient part 29, and reinforcing plate 37.

The embodiment forms the hole 31 through the resilient part 29 and inserts the boss 25 into the hole 31 to hold the resilient part 29 between the base plate 19 and the reinforcing plate 37. Instead of the hole 31, the resilient part 29 may have extensions that extend in the Y-direction from the first side 29a of the resilient part 29 on both sides of the boss 25. These extensions are sandwiched fixed between the base plate 19 and the reinforcing plate 37, so that the base plate 19 may stably and resiliently support the rigid part 27. This arrangement is also capable of thinning the resilient part 29 to provide a low spring constant. The extensions may each have an optional length in the Y-direction.

The present invention may be embodied in other specific forms without departing from the spirit or essential characteristics thereof. The embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of manufacturing a head suspension for a disk drive, the bead suspension having a base plate to be attached to a carriage of the disk drive, a load beam consisting of a rigid part and a resilient part, to apply load onto a slider, the rigid part and resilient part being separately formed, a base end of the rigid pan being laid on and joined to a first side of the resilient part, and a reinforcing plate, the reinforcing plate and base plate being mounted to a second side of the resilient part to hold the second side of the resilient put between the reinforcing plate and the base plate, the method comprising:

a first step of forming small holes in at least one of the base plate and reinforcing plate; and a second step of welding the base plate, resilient part, and reinforcing plate by emitting laser beams into the small holes, to fix the second side of the resilient part between the base plate and the reinforcing plate.

2. The method of claim 1, wherein:

the base plate has a boss protruding from the base plate in a thickness direction, the boss being fitted to a hole formed in the carriage, to fix the base plate to the carriage;

each of the resilient part and reinforcing plate has a hole to receive the boss, at least one of the holes of the resilient pan and reinforcing plate serving as a positioning hole that precisely fits the boss;

the first step forms small holes in at least one of the base plate and reinforcing plate on each side of the boss receiving hole; and the second step welds the base plate, resilient part, and reinforcing plate by emitting laser beams into the small holes, to fix the second side of the resilient part between the base plate and the reinforcing plate.

* * * * *